(12) United States Patent
Hiei et al.

(10) Patent No.: US 8,464,691 B2
(45) Date of Patent: Jun. 18, 2013

(54) ACCELERATOR DEVICE

(71) Applicant: Mikuni Corporation, Tokyo (JP)

(72) Inventors: Masaki Hiei, Odawara (JP); Keigo Suzuki, Odawara (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 13/690,455

(22) Filed: Nov. 30, 2012

(65) Prior Publication Data

US 2013/0087121 A1  Apr. 11, 2013

Related U.S. Application Data

(63) Continuation of application No. PCT/JP2011/062624, filed on Jun. 1, 2011.

(30) Foreign Application Priority Data

Jun. 2, 2010  (JP) .................................. 2010-126524

(51) Int. Cl.
*F02D 11/02* (2006.01)

(52) U.S. Cl.
USPC .......................................... 123/400; 74/551.9

(58) Field of Classification Search
USPC ................ 123/337, 400, 376; 74/484 R–489, 74/491, 551.1–551.9
See application file for complete search history.

(56) References Cited

U.S. PATENT DOCUMENTS

| 6,318,490 B1 * | 11/2001 | Laning | 180/170 |
| 6,840,096 B2 * | 1/2005 | Samoto et al. | 73/114.36 |
| 6,920,805 B2 * | 7/2005 | Samoto et al. | 74/485 |
| 7,287,512 B2 * | 10/2007 | Possehl et al. | 123/400 |
| 7,735,470 B2 * | 6/2010 | Palfenier et al. | 123/400 |
| 8,051,939 B2 * | 11/2011 | Kondo et al. | 180/219 |
| 8,302,467 B2 * | 11/2012 | Tanaka et al. | 73/114.36 |

FOREIGN PATENT DOCUMENTS

| JP | 10-339180 | 12/1998 |
| JP | 2002-264876 | 9/2002 |
| JP | 2003-252274 | 9/2003 |
| JP | 2006-182178 | 7/2006 |
| JP | 2010-71235 | 4/2010 |

OTHER PUBLICATIONS

International Search Report of Corresponding PCT Application PCT/JP2011/062624 mailed Aug. 16, 2011.

* cited by examiner

*Primary Examiner* — Hai Huynh

(57) ABSTRACT

An accelerator device capable of achieving miniaturization and easily varying torque characteristics with a simple structure. The accelerator device includes a housing, a grip-side rotary body which is rotated with accelerator operation, a friction member including a contact portion to apply resistance due to friction as being contacted to the grip-side rotary body, an urging member which is connected to the housing via the friction member and connected to the grip-side rotary body and which urges the grip-side rotary body to rotate to an initial position side, and a restriction portion which is arranged at the housing and which restricts rotation of the friction member with the urging force of the urging member as being contacted to the friction member. Here, the friction member is urged by the urging member in a direction that the contact portion is pressed to an outer circumferential face of the rotary body having the restriction portion as a fulcrum.

12 Claims, 12 Drawing Sheets

ACCELERATOR DEVICE

CROSS-REFERENCE TO RELATED APPLICATIONS

This application is a continuation, filed under 35 U.S.C. §111(a), of PCT International Application No. PCT/JP2011/062624, filed Jun. 1, 2011, which application claims the priority benefit of Japanese Patent Application No. 2010-126524, filed Jun. 2, 2010, the disclosures of which are incorporated herein by reference.

BACKGROUND

1. Field

The present invention relates to an accelerator device which outputs a signal indicating a rotation angle of a rotary body to be rotated by external operation for controlling opening and the like of a throttle valve.

2. Description of the Related Art

Traditionally, an accelerator device and a throttle valve are interlocked by a wire (an outer tube and an inner wire), for example. Recently, fuel injection apparatuses have been used instead of carburetors. In such a case, an operational amount of an accelerator device is measured, the measured operational amount is output as a signal, opening of a throttle valve and a fuel injection amount in a fuel injection apparatus are controlled based on the signal, and further, the signal is used for controlling an automatic transmission.

Here, a portion of an accelerator device to be operated by an operator has a similar structure to the traditional one even though a wire is not used. For example, an accelerator pedal similar to the traditional one is used for an automobile in which an accelerator device is operated with a foot and an accelerator grip is used for a vehicle or the like such as a motorcycle in which an accelerator device is operated with a hand.

A rotary body is rotated with operation of the accelerator pedal or the accelerator grip, a rotation angle of the rotary body is measured, and a signal based on the measured rotation angle is defined as the signal indicating the abovementioned operational amount.

Further, an accelerator pedal and an accelerator grip are operated toward an acceleration side (a side to enlarge opening of a throttle valve) from an idling position and urged to be returned from an operational position at the acceleration side toward the idling position by return urging means.

Accordingly, when operating the accelerator pedal or the accelerator grip, an operator performs operation to the acceleration side against the return urging means and performs operation to the idling side with urging force of the return urging means or as suppressing the urging force thereof.

Traditionally, owing to that an outer tube and an inner wire is connected to an accelerator device, friction force of the inner wire sliding against the outer tube is applied in addition to urging force of the abovementioned return urging means. Accordingly, the urging force of the return urging means is determined in consideration of the friction force of the inner wire. Further, traditionally, the abovementioned friction force of the inner wire generates hysteresis between rotation toward an acceleration side and rotation toward a returning side in relation between a rotation angle of a rotary body and rotation torque of the rotary body. Here, torque required to rotate the rotary body toward the acceleration side is higher than that toward the returning side at the same rotation angle of the rotary body.

The hysteresis stabilizes operability of small acceleration operation. Here, with an accelerator device which simply outputs a signal without having an inner wire being connected, an operator develops a feeling of strangeness with influence to operability as being different from traditional operability. Accordingly, it has been desired to stabilize operability.

In view of the above, it has been proposed to generate the above-mentioned hysteresis by generating friction corresponding to urging force of return urging means at a section rotated with accelerator operation. For example, see Japanese Patent Publication No. 3602295.

In Japanese Patent Publication No. 3602295, an accelerator shaft is rotatably supported about an axis via a bearing with a bearing bush arranged at a housing. An accelerator lever which is rotated in accordance with accelerator pedal operation is rotatably fixed to the accelerator shaft as being integrated therewith. A sensor measures a rotation angle of the accelerator shaft and outputs a signal indicating the rotation angle, for example, for controlling opening of a throttle valve.

An outer spring and an inner spring being torsion coil springs are coaxially arranged in a two-track manner around the accelerator shaft.

Further, an outer spring guide is arranged as being rotatable integrally with the accelerator lever and movable slightly in a decentering direction (a direction intersecting with a circumferential direction) and is provided with a cylindrical guide portion inserted to the outer spring.

Further, an inner spring guide having a guide portion to which the inner spring is inserted is arranged as being rotatable integrally with the outer spring guide and movable slightly in the decentering direction.

The outer spring is fixed respectively to the outer spring guide and the housing and urges the accelerator lever via the outer spring guide in a rotation direction being an accelerator closing direction (a direction to close the throttle valve).

The inner spring is fixed respectively to the inner spring guide and the housing and urges the accelerator lever in the accelerator closing direction via the inner spring guide and the outer spring guide. Further, the inner spring is arranged between the inner spring guide and the housing in a state of being compressed in the axial direction. Further, the inner spring guide is slightly movable in the axial direction of the accelerator shaft.

Further, a support including an approximately cylindrical outer guide wall capable of contacting to an inner circumferential face of the guide portion of the outer spring guide and an approximately cylindrical inner guide wall capable of contacting to an inner circumferential face of the guide portion of the inner spring guide is attached to the housing. Further, the support is slightly movable in the axial direction of the accelerator shaft.

In the accelerator device as described above, when the accelerator lever is to be rotated with accelerator operation in an accelerator opening direction (a direction to open the throttle valve), urging force of the outer spring and the inner spring is exerted in the opposed rotation direction.

At that time, the outer spring exerts force to move the outer spring guide in the decentering direction, so that friction force is generated with an inner circumferential face of the guide portion of the outer spring guide pressed to the outer circumferential face of the outer guide wall of the support.

Further, the inner spring exerts force to move the inner spring guide in the decentering direction, so that friction force is generated with an inner circumferential face of the guide portion of the inner spring guide pressed to an outer circumferential face of the inner guide wall of the support.

Further, since the inner spring is arranged between the inner spring guide and the housing in a compressed state, urging force is generated in the axial direction (rotation axis direction) of the accelerator shaft. Accordingly, the inner spring guide is pressed to the support along the rotation axis direction and the support is pressed to the spring guide thereby. Thus, when the inner spring guide and the outer spring guide are rotated along with the accelerator lever, friction force is generated between the inner spring guide and the support and between the support and the outer spring.

In the accelerator device, the abovementioned hysteresis can be generated owing to the abovementioned friction between the inner spring guide and the support and between the outer spring guide and the support instead of friction between an inner wire and an outer tube which are conventionally used.

In Japanese Patent Publication No. 3602295, since the force of the outer spring and the inner spring to decenter the outer spring guide and the inner spring guide is small and the friction force caused thereby is small, two springs being the outer spring and the inner spring are inevitably required. Further, owing to that the inner spring is arranged in a state of being compressed in the axial direction to supplement friction force with the decentering, friction force in the rotation axis direction is used as well as the decentering direction.

In Japanese Patent Publication No. 3602295 described above, since a number of members such as the outer spring, the outer spring guide, the support having two-track cylindrical guide walls, the inner spring, and inner spring guide are required to be arranged approximately coaxially, the accelerator device becomes large in the spring radial direction and miniaturization becomes difficult.

Further, since the inner spring is accommodated in a compressed state, loads are exerted in the axial direction of the accelerator shaft on the housing and a fastening portion for fixing such as a fixing portion of the accelerator lever to cause structural problems.

Further, since the outer spring guide and the inner spring guide are movable in the decentering direction against the outer guide wall and the inner guide wall of the support, there is a clearance between the guide portion of the outer spring guide and the outer guide wall and there is a clearance between the guide portion of the inner spring guide and the inner guide wall.

The outer spring guide and the inner spring guide are moved by the abovementioned force in the decentering direction based on the clearances, so that the guide portion of the outer spring guide and the outer spring guide are to be contacted and the guide portion of the inner spring guide and the inner guide wall are to be contacted. Further, in accordance with a rotation angle of the accelerator lever, the abovementioned decentering direction is varied and the abovementioned contact position is varied as well.

In such a state, there is a fear of entering of foreign matters into the abovementioned clearances. In a case that foreign matters enter to be sandwiched or to be further bitten between members, for example, there is a problem that the accelerator device is in a state of poor operation and operational failure.

Two hooks of the outer spring and two hooks of the inner spring are engaged with the housing and either of the outer spring guide and the inner spring guide. Here, for matching force exerted by the outer spring and the inner spring in the decentering direction, positions of the hooks of the outer spring and the inner spring are required to be matched. Accordingly, restriction occurs for return force and angles of the springs and designing of the accelerator device is restricted.

Further, the decentering direction of the two springs is not always stabled. Further, for obtaining large force with the springs in the decentering direction, it is required that a wire diameter of the torsion coil spring is enlarged and that effective turns are lessened.

Further, for finely adjusting hysteresis difference, it is required to vary a spring hook position or to vary spring characteristics (return force, thrust force). In such a case, it is required to match the decentering directions of the two springs as described above, so that difficult adjustment is caused.

Further, in Japanese Patent Publication No. 3602295, the support is to be contacted to each of the outer spring guide and the inner spring guide respectively at two positions in the decentering direction and the rotation direction, so that friction force is generated at four contact positions in total. Further, the friction force is balanced with accuracy in shape of each member. In addition, the direction of the friction force is varied in accordance with the rotation angle of the accelerator lever, as described above. In such a state, there is a fear that a plurality of steps in torque characteristics of the accelerator lever is caused by wear of each member due to friction. In such a case, since the torque characteristics are varied, for example, there is a fear that a feeling of strangeness occurs at operability.

SUMMARY

To address the above issues, an aspect of the present invention is to provide an accelerator device capable of achieving miniaturization and easily varying torque characteristics with a simple structure.

Additional aspects will be set forth in part in the description which follows and, in part, will be apparent from the description, or may be learned by practice of the invention.

To achieve the abovementioned aspect, an accelerator device includes a housing, a rotary body which is rotated with accelerator operation, a friction member which is arranged at a periphery of the rotary body while being provided with a contact portion to apply resistance due to friction as being contacted to the rotary body, an urging member having one end side engaged with the rotary body and the other end side engaged with the friction member, and a restriction portion which is arranged at the housing and which restricts rotation of the friction member with urging force of the urging member as being contacted to the friction member. Here, the urging member urges the rotary body in a direction to return to an initial position of rotation against the housing owing to that rotation of the friction member is restricted against the housing by the restriction member when the rotary body is rotated against the housing, and the friction member is urged by the urging member in a direction that the contact portion is pressed to the rotary body having the restriction portion as a fulcrum.

When the rotary body of the accelerator device is rotated with accelerator operation, urging force to rotate the rotary body in a return direction may be generated with elastic deformation of the urging member. The urging force urges the friction member in a rotation direction. Here, since rotation of the friction member is restricted by the restriction portion, the direction of the urging force is varied to the direction to press the contact portion to an outer circumferential face of the rotary body having the friction portion as a fulcrum.

Accordingly, the contact portion of the friction member is pressed to the rotary body and friction force is generated. Here, although friction force is varied with an elastic deformation amount of the urging member due to the rotation angle of the rotary body, the direction of the friction force remains the same regardless of the rotation angle of the rotary body. The friction force generates hysteresis at the rotation torque of the rotary body between the opening side and the returning side, so that operation of the accelerator device can be stabilized.

At that time, the urging force of the urging member exerted to the friction member is required to have a component in the direction to press the contact portion to the rotary body.

According to the above structure, a majority of the urging force of the urging member against the friction member can be converted by the restriction portion which restricts rotation of the friction member from the force in the rotation direction of the rotary body into the force in the direction to press the contact portion to the outer circumferential face of the rotary body. Depending on the urging force of the urging member, it becomes possible to press the contact portion to the rotary body with relatively large force.

Accordingly, it is possible that a single spring functions as the urging member, for example. Further, it is required to have one each as the friction member and the urging member against the housing and the rotary body for the structure to apply friction force to the rotary body. Accordingly, an accelerator device can be provided simply at low cost. Further, owing to the abovementioned simple structure, it is possible to miniaturize the structural portion to apply friction to the rotary body and to further miniaturize the accelerator device.

Further, torque characteristics can be easily varied by shaping a cross-section of the abovementioned rotary body like a circle, elliptic, or oval. In addition, since only one spring is used as the urging member without having a plurality of members for the friction and two springs not like a traditional case, there is less restriction for the spring characteristics for applying friction to the rotary body. Therefore, even though the friction force is obtained from the urging force of the urging member, it is possible to freely set return force to an initial position side of the rotary body and the like with a high degree of freedom for designing the urging member.

Further, fine adjustment of the hysteresis can be performed by varying the spring characteristics of the urging member, varying an engagement position of a spring being the friction member, a contact position of the restriction portion and a position of the contact portion, varying contact area between the rotary body and the contact portion, and the like. Accordingly, it is possible to easily design an accelerator device having a mechanism to apply friction force.

In the accelerator device, the friction member may be provided with the contact portion being apart from a contact position of contacting to the restriction portion so that the contact portion is swingable in a direction of pressing the contact portion to the rotary body having the restriction portion as a fulcrum.

Since the friction member may be provided with the contact portion being apart from the contact position of contacting to the restriction portion, the friction member can be set to be swingable in the direction of pressing the contact portion of the friction member to the rotary body having the restriction portion as a fulcrum.

Further, the contact portion of the friction member may be pressed to the rotary body by the urging force of the urging member exerted to the engagement position of the urging member having the contact position of the restriction portion as a fulcrum.

In the accelerator device, the friction member may be provided with the contact portion which is spaced from the contact position of contacting to the restriction portion in a circumferential direction of the rotary body as being aligned in the circumferential direction.

Since the friction member may be provided with the contact portion which is spaced from the contact position of contacting to the restriction portion in the circumferential direction of the rotary body as being aligned in the circumferential direction, the friction member can be arranged around the rotary body as being annulus-shaped or arc-shaped. Accordingly, the structure to apply friction can be compactly arranged.

In the accelerator device, the friction member may be annulus-shaped or arc-shaped along the circumferential direction of the rotary body having a face which is oriented to the rotary body side except for the contact portion arranged as being spaced from the rotary body in a state that the contact portion is contacted to the rotary body.

Since the face oriented to the rotary body side except for the contact portion may be spaced from the rotary body in a state that the contact portion is contacted to the rotary body, only the contact portion of the friction member is contacted to the rotary body as receiving the urging force of the urging member in a state that the contact portion of the friction member is pressed to the rotary body.

Accordingly, the position of the contact portion to which the pressing force toward the rotary body is exerted is fixedly determined on the friction member against the contact position of the restriction portion to be a swinging fulcrum of the friction member and the engagement position of the urging member to which the force of the urging member is exerted. Therefore, the contact portion can be pressed in the same direction regardless of the rotation angle of the rotary body. Accordingly, the friction force can be applied to the rotary body in accordance with the rotation angle of the rotary body in a stable state.

Further, even if wear due to long-term usage occurs, the wear occurs at a contact section between the contact portion and a contact part of the rotary body. Accordingly, steps and the like are not generated at the rotation torque characteristics of the rotary body and the friction force does not rapidly vary.

Here, the contact area between the rotary body and the friction member is determined by a shape of the contact portion. Accordingly, fine adjustment of the hysteresis between the opening side and the returning side of the rotary body can be performed, for example, as easily varying the contact area by varying the shape of the contact portion.

The accelerator device may have a contact position of contacting to the restriction portion and an engagement position of engaging with the urging member which are arranged apart in the friction member so that the friction member is swung with urging force of the urging member having the restriction portion as a fulcrum.

Since the contact position of contacting to the restriction portion and the engagement position of engaging with the urging member are arranged apart in the friction member, the urging member can urge the contact portion of the friction member in the direction to be pressed to the rotary body having the restriction portion as a fulcrum. For example, even when the urging force of the urging member is exerted in the direction to rotate the friction member having the center of the rotary body as the rotation center, the urging force of the urging member is converted into the force in the direction to swing the friction member having the contact position with the restriction portion as a fulcrum. Accordingly, the contact portion of the friction member can be pressed effectively to the rotary body. Here, the urging force of the urging member is required to have force of a component in the direction to press the contact portion to the rotary body side.

The accelerator device may have the contact position of contacting to the restriction portion and the engagement position of engaging with the urging member which are spaced in the friction member in a circumferential direction of the rotary body as being aligned in the circumferential direction.

Since the contact position of contacting to the restriction portion and the engagement position of engaging with the urging member are spaced in the friction member in a circumferential direction of the rotary body as being aligned in the circumferential direction, the urging force is exerted to rotate the friction member to the opposite side to the return direction of the rotary body at the engagement position of the friction member with the urging member and the urging direction is varied to urge in the direction of rotating the friction member having the restriction portion as a fulcrum when rotation of the friction member is restricted as being contacted to the restriction portion. Accordingly, the contact portion of the friction member can be pressed to the rotary body by effectively using the urging force of the urging member. Further, since the contact position with the restriction portion and the engagement position with the urging member are formed as being aligned in the circumferential direction, the friction member can be arranged around the rotary body as being annulus-shaped or arc-shaped. Accordingly, the structure to apply friction can be compactly arranged.

According to the present invention, miniaturization of an accelerator device can be achieved and designing of the accelerator device can be facilitated.

BRIEF DESCRIPTION OF THE DRAWINGS

These and/or other aspects will become apparent and more readily appreciated from the following description of embodiments, taken in conjunction with the accompanying drawings of which.

DESCRIPTION OF EMBODIMENTS

Figure 1:
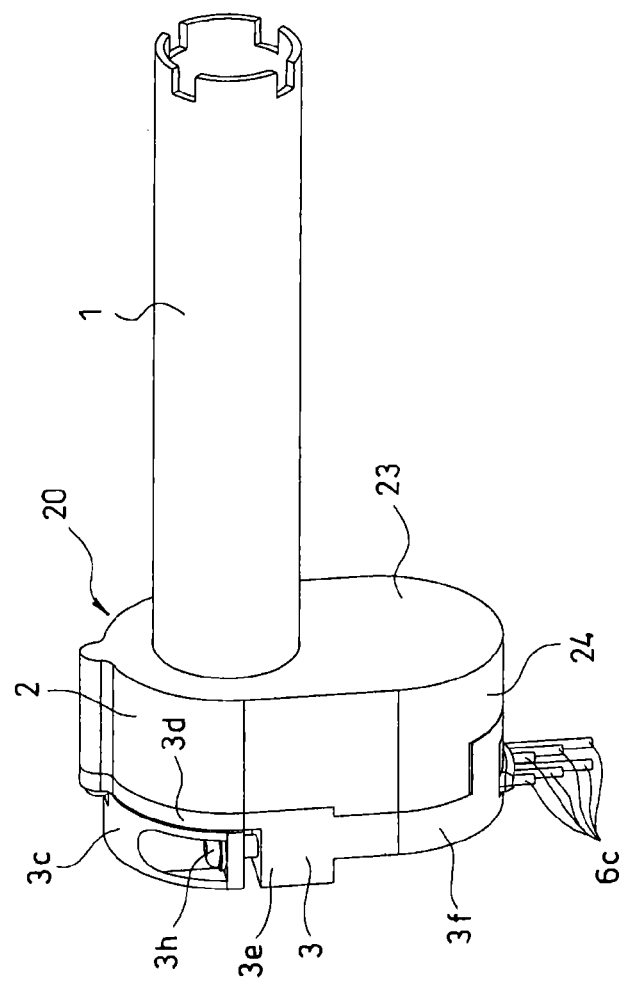
FIG. 1 is a perspective view illustrating an accelerator device according to a first embodiment of the present invention.
Figure 2:
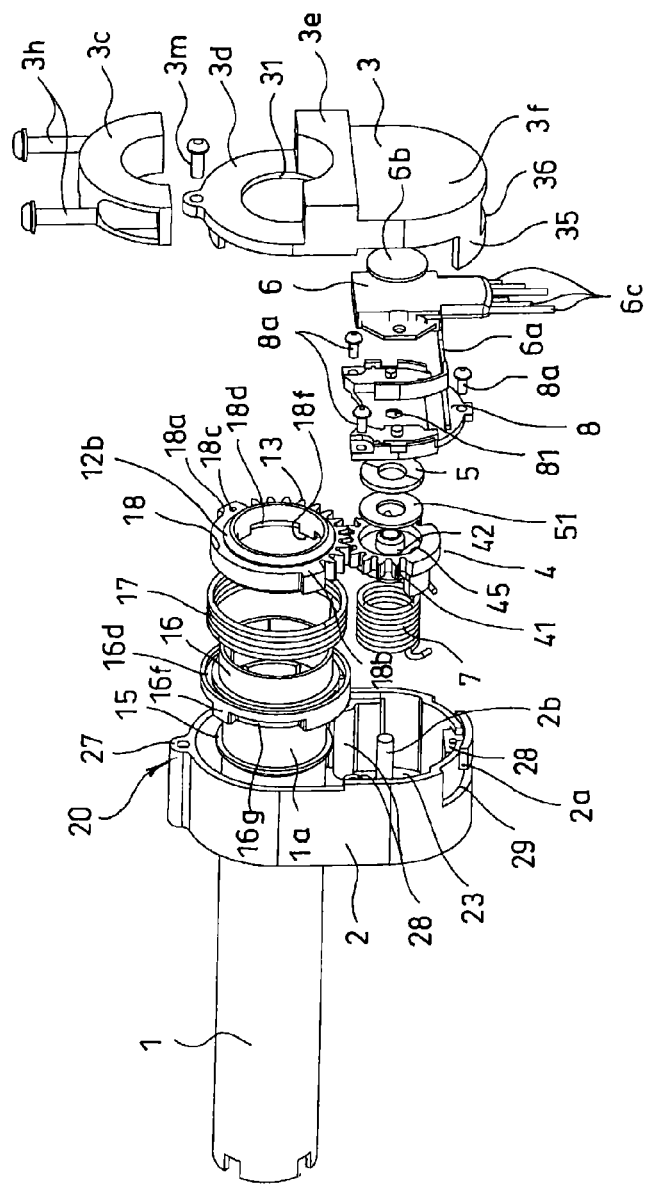
FIG. 2 is an exploded perspective view illustrating the accelerator device.
Figure 3:
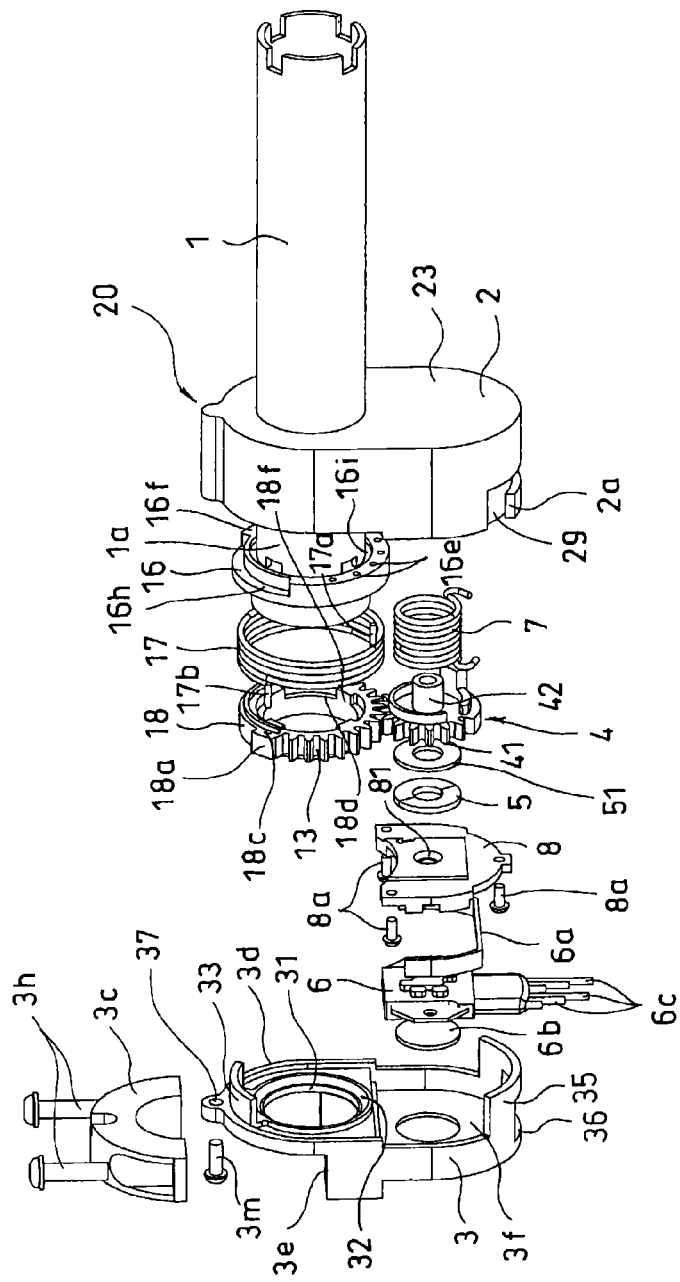
FIG. 3 is an exploded perspective view illustrating the accelerator device.

Reference will now be made in detail to embodiments, examples of which are illustrated in the accompanying drawings, wherein like reference numerals refer to like elements throughout.

In the following, a first embodiment of the present invention will be described with reference to the drawings.

As illustrated in FIGS. 1 to 7(b), an accelerator device is provided with a grip 1 which is rotated integrally with an accelerator grip (not illustrated) as being inserted to the accelerator grip, a case 2 which is arranged to surround a base end part of the grip 1, and a cover 3 which is fixed to the case 2. A housing 20 is structured with the case 2 and the cover 3.

The accelerator grip to be actually held by a hand of an operator during operation is integrally fixed to an outer circumferential portion of the grip 1 in a rotatable manner and a distal end part of a handlebar (not illustrated) is inserted to an inner circumference of the base end part of the grip 1.

Further, a friction applying mechanism which generates friction force when rotating the grip 1 while applying urging force to the grip 1 in a later-mentioned return direction is arranged at the base end part of the grip 1 arranged in the housing 20 of the accelerator device.

Further, a rotation angle measuring mechanism which measures a rotation angle of the grip 1 (grip-side rotary body 1a) is arranged at a section of the accelerator device as being adjacent to the grip 1 in the housing 20.

Next, the friction applying mechanism and a friction applying mechanism in the rotation angle measuring mechanism will be described.

The friction applying mechanism is provided with an annular and flange-shaped guide portion 15 which is arranged at an outer circumferential face of the grip 1 at the base end part side, a grip-side rotary body 1a being a section at the base end side from the guide portion 15 of the grip 1, an approximately-cylindrical friction member 16 which is arranged to surround the grip-side rotary body 1a, an urging member 17 being a torsion spring arranged at an outer circumference side of the friction member 16, and a rotation transmitting member 18 which transmits rotation to a later-mentioned rotor 4 to be measured as being rotated integrally with the grip 1 (grip-side rotary body 1a).

Here, the grip-side rotary body 1a and the rotation transmitting member 18 are collectively defined as a rotary body.

The grip-side rotary body 1a arranged integrally with the grip 1 is cylindrical to structure the base end part of the cylindrical grip 1.

The flange-shaped guide portion 15 is annular as being arranged integrally with the grip 1 in a state that an inner circumference side thereof is connected integrally with the grip 1. A side face of the guide portion 15 oriented to the distal end side of the grip 1 forms an inclined face (taper face 12a) inclined toward the base end side from the inner side to the outer side, so that an outer circumferential face at the distal end side of the grip 1 out of the outer circumferential face of the guide portion 15 forms an outer circumferential face shaped into a truncated cone. The taper face 12a is abutted to a taper face 22 which is formed at an inner circumferential face of a grip penetration hole 21 of a later-mentioned bottom plate 23 of the case 2 for penetration of the grip 1. The taper face 12a and the taper face 22 which are mutually abutted function as bearing means for the grip 1 to rotatably support the grip 1 while restricting movement of the grip 1 to the distal end side in the axial direction.

Further, the side face of the guide portion 15 oriented to the base end side of the grip 1 forms an annular plane which is perpendicular to the axial direction of the grip 1. Further, four concave portions 1b are formed at the base end part of the grip 1, that is, the base end part of the grip-side rotary body 1a at regular intervals in the circumferential direction to be engaged with the rotation transmitting member 18 as described later. The grip 1 forms a core member of the accelerator grip in a state of being inserted to the accelerator grip.

The friction member 16 including a cylindrical portion 16a and a flange portion 16b having a larger diameter than the cylindrical portion 16a is in a state that the grip-side rotary body 1a of the grip 1 is inserted to the inside thereof. Further, the friction member 16 is arranged between the guide portion 15 and the rotation transmitting member 18 which is connected to the distal end of the grip-side rotary body 1a. The flange portion 16b being a large-diameter portion is arranged at the guide portion 15 side and the cylindrical portion 16a being a small-diameter portion is arranged at the rotation transmitting member 18 side.

At the inner circumferential face side of the friction member 16, the cylindrical portion 16a and the flange portion 16b are formed to have the same diameter. The inner diameter of the friction member 16 is slightly larger than an outer diameter of the grip-side rotary body 1a. Accordingly, clearance is provided between the outer circumferential face of the rotary body 1a and the inner circumferential face of the friction member 16.

Further, a contact portion 16c which is contacted to the outer circumferential face of the grip-side rotary body 1a when a center axis of the grip-side rotary body 1a is arranged coaxially on a center axis of the inner circumferential face of the friction member 16 is arranged at the inner circumferential face of the friction member 16. The contact portion 16c is extended in the axial direction of the friction member 16 with the same width from one end side to the other end side in a state of being protruded from the inner circumferential face of the friction member 16. Further, the contact portion 16c has an inner circumferential face being arc-shaped in a cross-section. The center of the arc-shaped inner circumferential face of the contact portion 16c is approximately matched with the center of an arc of an arc-shaped inner circumferential face of the friction member 16 except for the contact portion 16c. Further, an inner diameter of the inner circumferential face of the contact portion 16c is approximately the same as the outer diameter of the grip-side rotary body 1a.

An annular groove portion 16d is formed at a back face of the flange portion 16b at the cylindrical portion 16a side. One end side of the urging member 17 being a torsion coil spring is slightly inserted to the groove portion 16d. Further, hooks 17a, 17b are arranged respectively at both end parts of the urging member 17 approximately along the axial direction of the urging member 17 being the torsion coil spring. A plurality (e.g., five) of engagement holes 16e to which the hook 17a of the end part of the urging member 17 at the flange portion 16b side can be inserted are formed at the groove portion 16d of the flange portion 16b.

The plurality of engagement holes 16e are arranged on a line along the direction of the annular groove (circumferential direction) in the groove portion 16d. Further, space is formed between the engagement holes 16e. In the present embodiment, the engagement holes 16e are formed at regular intervals. Further, the engagement holes 16e penetrate the flange portion 16b.

The hook 17a is actually inserted to one of the engagement holes 16e. The plurality of engagement holes 16e are for adjusting an engagement position of the hook 17a of the urging member 17.

Owing to adjustment of the position of the hook 17a, urging force of the urging member 17 can be adjusted in a state that the grip-side rotary body 1a is at an initial position, thereby adjustment of the urging force can be performed when the grip-side rotary body 1a is rotated. Further, fine adjustment of hysteresis can be performed as described later.

An engagement portion 16f to be contacted to a restriction portion 19 (illustrated by a broken line in FIG. 7(a)) which restricts rotation of the friction member 16 is arranged at a front face of the flange portion 16b being at the opposite side to the cylindrical portion 16a side.

The restriction portion 19 arranged at an inner face side of the bottom plate 23 of the case 2 of the housing 20 is protruded from the inner face of the bottom plate 23 which is arranged in parallel to a face of the flange portion 16b at the front face side.

Further, the engagement portion 16f is a section between two cutout portions 16g, 16h which are formed into a state of being opened to the outer circumferential face side and the front face side along the circumferential direction.

That is, the outer circumferential face of a section from the cutout portion 16g to the cutout portion 16h recedes inside as being lessened in diameter, and then, the engagement portion 16f is arranged thereat in a state of being protruded to the outer circumference side. Here, a face of the engagement portion 16f at the outer circumference side is matched with the outer circumferential face of the entire flange portion 16b so that the engagement portion 16f is not protruded from the outer circumferential face of the flange portion 16b.

Right-left side faces faced respectively to the cutout portions 16g, 16h of the engagement portion 16f are flat faces along a radial direction of the cylindrical friction member 16. One side face of the right-left side faces of the engagement portion 16f oriented to the cutout portion 16h side is to be contacted to the restriction portion 19.

The restriction portion 19 is to be contacted to the side face of the engagement portion 16f oriented to the cutout portion 16h side in a state of entering into the cutout portion 16h. A face of the restriction portion 19 contacted to the engagement portion 16f is to be face-contacted to the abovementioned one side face of the engagement portion 16f and is along the radial direction of the friction member 16 in a state of being contacted to the one side face of the engagement portion 16f.

Further, an annular cutout portion 16i is formed at an inner circumferential portion in a state of being opened to a side face and an inner circumferential face at the front side. Here, an inner diameter of an end part of the flange portion 16b (friction member 16) at the guide portion 15 side is slightly enlarged. The guide portion 15 is approximately contacted to the side face and the inner circumferential face of the flange portion 16b in the cutout portion 16i in a state that the guide portion 15 enters to the cutout portion 16i. Accordingly, the guide portion 15 closes an opening section of the clearance between the inner circumferential face (except for the contact portion 16c) of the friction member 16 and the outer circumferential face of the grip-side rotary body 1a.

Further, in FIG. 7(a), an urging direction of the urging member 17 is counterclockwise. The contact portion 16c is arranged at a position between the engagement portion 16f (the restriction portion 19 contacted to the engagement portion 160 and the engagement hole 16e to which the hook 17a of the urging member 17 is inserted at the periphery of the grip-side rotary body 1a. Here, there are two ranges between two points on the circumference. The contact portion 16c is arranged in one range of the above at the opposite side in the urging direction of the urging member 17 (clockwise direction) against the engagement hole 16e.

The arc face at the inner side of the contact portion 16c is contacted to the outer circumferential face of the grip-side rotary body 1a in a state that one end part of the urging member 17 is inserted to the groove portion 16d and one hook 17a is inserted to the engagement hole 16e. Further, the engagement portion 16f is abutted as being pressed to the restriction portion 19 in a state that the engagement portion 16f is contacted to the restriction portion 19 and the contact portion 16c is abutted as being pressed to the outer circumferential face of the grip-side rotary body 1a. This state is stable.

Here, as described later, the grip 1 (grip-side rotary body 1a) is in a state of being rotatably supported by the housing 20.

As described above, the urging member 17 is a torsion coil spring having the hooks 17a, 17b at both of the end parts. One hook 17a is connected to the friction member 16 and the other hook is connected to the rotation transmitting member 18 which is integrally rotated with the grip-side rotary body 1a. In the friction applying mechanism, the rotation transmitting member 19 can be regarded as a part of the grip-side rotary body 1a. Further, a coil section is arranged at the outer circumference side of the cylindrical portion 16a of the friction member 16. That is, the cylindrical portion 16a of the friction member 16 is inserted to the coil section of the urging member 17 to be in a state that the urging member 17 and the friction member 16 are overlapped in and out.

In the rotation transmitting member 18 which is an approximately annular member, a part of an outer circumference thereof is an arc-shaped sector gear 13 and the rest of the outer circumference is an arc face.

Further, protrusion portions 18a, 18b protruded to the outer circumference side are arranged at two boundary sections between the sector gear 13 and the arc face of the annular (short cylinder-shaped) rotation transmitting member 18.

The protrusion portions 18a, 18b are to restrict a rotation range of the rotation transmitting member 18 (grip-side rotary body 1a) by being contacted to one of both circumferential side faces of an arc-plate-shaped stopper member 33 formed at the cover 3 with rotation of the rotation transmitting member 18 (grip-side rotary body 1a), thereby restricting a rotation range of the accelerator grip as well. Further, in the annular rotation transmitting member 18, the sector gear 13 is arranged from one protrusion portion 18a to the other protrusion portion 18b at a section where the stopper member 33 is not arranged out of two sections between the protrusion portions 18a, 18b.

An engagement hole 18c to which the other hook 17b of the urging member 17 is inserted to be engaged is arranged at one protrusion portion 18a out of a pair of the protrusion portions 18a, 18b.

Further, a step 18d is formed at the inner circumferential face of the rotation transmitting member 18 between the case 2 side and the cover 3 side of the housing 20 in the axial direction. An inner diameter of the bottom plate 23 of the case 2 to which the grip-side rotary body 1a is inserted is set larger than an inner diameter of the cover 3 side. The grip-side rotary body 1a is inserted to the inner circumference side of the annular rotation transmitting member 18. The inner diameter of the step 18d of the rotation transmitting member 18 at the side where the grip-side rotary body 1a is inserted is slightly larger than the outer diameter of the grip-side rotary body 1a by the amount of clearance enabling the grip-side rotary body 1a to be inserted thereto.

Further, a plurality of convex portions 18f extended having the same width along the axial direction are arranged at a section of the inner circumferential face of the rotation transmitting member 18 to which the grip-side rotary body 1a is inserted (bottom plate 23 side of the case 2 from the step 18d) side by side at intervals in the circumferential direction.

For example, four of the convex portions 18f are arranged side by side in the circumferential direction at regular intervals.

Further, four of the rectangular concave portions 1b concaved in the axial direction as described above are arranged at the base end of the grip-side rotary body 1a being the base end of the grip 1 as corresponding to the convex portions 18f of the rotation transmitting member 18 to be engaged with the four of the convex portions 18f of the rotation transmitting member 18. Accordingly, the grip-side rotary body 1a and the rotation transmitting member 18 are integrally rotatable.

Further, an end face of the annular base end part of the rotation transmitting member 18 abutted to the cover 3 is a truncated-cone-shaped taper face 12b receding at the outer circumference side than the inner circumference side.

The taper face 12b is abutted to a taper face 32 which is formed at the cover 3 and which is formed at an inner circumferential face of a cover penetration hole 31 to which a distal end part of a handlebar is inserted so that the distal end part of the handlebar is inserted into the grip 1. The taper face 12b and the taper face 32 which are mutually abutted function as bearing means for the grip 1 to rotatably support the grip-side rotary body 1a and the grip 1 via the rotation transmitting member 18 while restricting movement of the rotation transmitting member 18, the grip-side rotary body 1a, and the grip 1 to the cover 3 side in the axial direction.

Next, the rotation angle measuring mechanism of the accelerator device will be described.

The rotation angle measuring mechanism is provided with the rotor 4 to be measured which is rotated with rotation of the grip 1, a magnet 5 which is rotated with rotation of the rotor 4 to be measured, rotation angle detector 6 which detects a rotation angle of the grip 1 based on magnetic amount variation due to rotation of the magnet 5, and urging means 7 which returns the rotor 4 to be measured to an original position by urging the rotor 4 to be measured in the rotation direction.

Further, in this example, the accelerator device includes a separation member 8 disposed between the rotor 4 to be measured having the magnet 5 and the rotation angle detector 6.

The sector gear 13 of the rotation transmitting member 18 which is rotated integrally with the grip 1 transmits rotation of the grip 1 (grip-side rotary body 1a) to the rotor 4 to be measured as being engaged with a later-mentioned sector gear 41 which is formed at the rotor 4 to be measured.

The case 2 being a member having an oval shape connecting two semicircles with a rectangle includes an oval bottom plate 23 and a surrounding wall 24 which is formed at a peripheral edge part of the bottom plate 23 to surround the bottom plate 23.

The grip penetration hole 21 is formed at a position so that the center thereof is located at an approximate center of one semicircle of the oval-shaped bottom plate 23 of the case 2.

Here, the housing 20 combining the case 2 and the cover 3 has a shape of an oval cylinder. Having a boundary between the two semicircles of the oval, a section being one semicircle side forms a space to accommodate the abovementioned friction applying mechanism and a section being the other semicircle side forms a space to accommodate the rotation angle measuring mechanism.

Further, a shaft 2b rotatably supporting the rotor 4 to be measured is formed at the inner face of the bottom plate 23 of the case 2 not at the one semicircle side having the grip penetration hole 21 but at the approximate center of the other semicircle. Here, the shaft 2b is formed in a direction perpendicular to the bottom plate 23 as being arranged in parallel to axial direction of the grip 1.

Further, positioning of the urging means 7 being a torsion coil spring is performed at the inner face of the bottom plate 23 where the shaft 2b is formed while the hook of the torsion coil spring at one end side is engaged therewith.

A boss 27 having a hole in which a screw 3m is screwed for fixing the cover 3 is formed at a center section of the inner circumference side of the surrounding wall 24 at the semicircle section where the grip-side rotary body 1a is accommodated.

Further, bosses 28 having holes in which screws 8a for fixing the separation member 8 are screwed respectively are formed at a center part of the semicircle section of the surrounding wall 24 where the rotor 4 to be measured and the like are to be accommodated and at the inner circumferential sections of two linear sections of the surrounding wall 24.

Further, a concave portion 29 is formed at the center part of the outer circumference side of the semicircle section of the surrounding wall 24 where the rotor 4 to be measured and the like are accommodated as being at the cover 3 side. The concave portion 29 is formed to an end face of the surrounding wall 24 at the cover 3 side so that a later-mentioned engaging arc plate 35 of the cover 3 is to be arranged. Further, an engaging protrusion 2a is formed as being protruded approximately at the center part of the concave portion 29.

The engaging protrusion 2a is engaged with an engaging opening 36 formed at the engaging arc plate 35 which is to be in a state of being accommodated in the concave portion 29, so that the cover 3 and the case 2 are joined at sections where the rotor 4 to be measured is accommodated.

The cover 3 is fixed to the handlebar while closing an oval opening which is located at the opposite side to the bottom plate 23 of the closed-end cylindrical case 2. The cover is structured with a cover body 3a and a cover-fixing member 3c.

The cover 3 includes a fixing-member receiving portion 3d to which the cover fixing member 3c is arranged as facing thereto while structuring the semicircle section where the grip-side rotary body 1a is accommodated, a cover sandwiching portion 3e which sandwiches the handlebar as being opposed to the cover fixing member 3c, and a cap portion 3f which is arranged at the side accommodating the rotor 4 to be measured, the rotation angle detector 6 and the like.

The cover penetration hole 31 is formed across the fixing-member receiving portion 3d and the cover sandwiching portion 3e. Further, a screw hole 37 through which the screw 3m passes is formed at a center section of the semicircle.

The accelerator device is fixed to the handlebar as sandwiching the handlebar with the cover sandwiching portion 3e and the cover fixing member 3c.

That is, the cover 3 can be fixed to the handle bar by attaching the cover fixing member 3c to the cover sandwiching portion 3e with screwing using screws 3h while the cover sandwiching portion 3e and the cover fixing member 3c of the cover 3 are faced in a state that the handlebar is sandwiched by the cover fixing member 3c and the cover 3. In addition, the case 2 is fixed to the cover with fastening of the screw 3m and engaging between the engaging protrusion 2a of the concave portion 29 and the engaging opening 36 of the engaging arc plate 35. Accordingly, the entire accelerator device is fixed to the handlebar.

The cap portion 3f closes opening of a half of the case 2 at the side where the rotor 4 to be measured and the rotation angle detector 6 are arranged and the abovementioned engaging arc plate 35 extended to the case 2 side is arranged thereat.

The engaging arc plate 35 is formed in an arc shape which is the same shape as the arc of the semicircle section and is provided with the engaging opening 36. The abovementioned engaging protrusion 2a enters to and engages with the engaging opening 36. Further, a cable 6c being wiring for the rotation angle detector 6 is in a state of passing therethrough.

The rotor 4 to be measured is an approximately disc-shaped member and a cylindrical shaft portion 42 which is cylinder-shaped is arranged at the center part thereof.

The cylindrical shaft portion 42 is protruded to cover 3 side of the rotor 4 to be measured (the base end side of the grip 1) while being protruded to the bottom plate side of the case 2 of the rotor 4 to be measured (the distal end side of the grip 1).

The shaft 2b protruded from the bottom plate 23 is in a state of being inserted into the cylinder-shaped cylindrical shaft portion 42 from the opening of the cylindrical shaft portion 42 at the side of the bottom plate 23 of the case 2 and the rotor 4 to be measured is rotatable about the shaft 2b.

The end part of the cylindrical shaft portion 42 at the cover 3 side is a truncated-cone-shaped taper face and is abutted to a taper-shaped inner circumferential face of a bearing hole 81 being bearing means for the separation member 8, so that the rotation center of the cylindrical shaft portion 42 is maintained at a predetermined position in a state of being contacted to the bearing hole 81. Further, the distal end of the shaft 2b passing through the cylindrical shaft portion 42 penetrates the bearing hole 81 of the separation member 8.

Further, an annular groove 45 being a groove having an annular ring shape with the center thereof being at the cylindrical shaft portion 42 is formed around the cylindrical shaft portion 42 at a side face of the rotor 4 to be measured at the cover 3 side. A later-mentioned annular armature 51 and the annular magnet 5 are integrally arranged in the annular groove 45.

Further, the sector gear 41 is formed in an arc shape at a part of the outer circumference of the rotor 4 to be measured. The sector gear 41 is in a state of being engaged with the sector gear 13 of the rotation transmitting member 18. The grip-side rotary body 1a integrally rotated with the rotation transmitting member 18 and the rotor 4 to be measured are in a state of being mutually adjacent while rotation center axis directions thereof are mutually in parallel. The formed range of the sector gear 41 of the rotor 4 to be measured corresponds to the sector gear 13 of the rotation transmitting member 18 and the rotatable range thereof. The engaged state between the sector gear 41 of the rotor 4 to be measured and the sector gear 13 of the rotation transmitting member 18 can be maintained in the rotatable range of the rotation transmitting member 18 restricted as described above.

The magnet 5 is formed annularly as one semicircle section being a north pole and the other semicircle section being a south pole. Here, owing to being annularly-shaped, the shape is symmetric with respect to the axis. Further, the rotor 4 to be measured and the magnet 5 are arranged coaxially and each axis center thereof is to be the rotation center.

Further, the armature 51 is attached at a face of the magnet 5 at the grip-side rotary body 1a side in a state of being contacted thereto. The armature 51 formed annularly as well is rotated coaxially with the magnet 5 and the rotor 4 to be measured and each axis center thereof is the rotation center. The armature 51 closes magnetic flux and suppresses demagnetization of the magnet.

Here, the armature 51 is arranged to the magnet 5 at the opposite side to the rotation angle detector 6. The magnetic flux of the magnet 5 passes through the armature 51 while passing through space at the rotation angle detector 6 side.

The magnet 5 and the armature 51 are fixed as being rotatable integrally with the rotor 4 to be measured in a state of being accommodated in the annular groove 45 of the rotor 4 to be measured.

The urging means 7 being a torsion coil spring is fixed as positioning thereof being performed respectively to the inner face of the bottom plate 23 of the case 2 and the side face of the rotor 4 to be measured at the bottom plate 23 side. When deformation is generated as being twisted with rotation of the rotor 4 to be measured against the bottom plate 23, the urging means 7 generates urging force in the direction opposite to the rotation of the rotor 4 to be measured. In this manner, force returning the rotor 4 to be measured into an original position is exerted when the rotor 4 to be measured is rotated.

Since the axis center of the torsion coil spring being approximately cylinder-shaped and the axis center (rotation center) of the rotor 4 to be measured are matched as being coaxially arranged, the force of the torsion coil spring in the torsion direction is exerted in the circumferential direction as the rotation center of the rotor being the center.

Here, the axis center of the torsion coil spring and the axis center of the magnet 5 and the armature 51 which are annularly shaped are matched. That is, the urging means 7 being the torsion coil spring, the magnet 5, and the armature 51 are coaxially arranged.

A printed substrate on which a magnetic detection IC 61 is mounted is arranged inside the rotation angle detector 6. Here, the periphery of the printed substrate on which the magnetic detection IC 61 is mounted is covered by synthetic resin, for example.

The magnetic detection IC 61 is structured with a magnetic detection element and an integrated circuit which outputs a signal from the magnetic detection element. For example, a Hall element, a magnetoresistance element and the like can be used as the magnetic detection element.

Here, the magnetic detection element is arranged at an approximate center of a side face in a shape of the magnetic detection IC 61. Further, the center position of the magnetic detection IC 61 is located on an extension line of the axis center (rotation center) of the rotor 4 to be measured. Accordingly, the detection element of the magnetic detection IC 61 is arranged coaxially with the magnet 5 and the armature 51 which are arranged coaxially with the rotor 4 to be measured. With this structure, the detection element can detect a magnetic amount in a state of continuously maintaining the constant distance from the magnet 5 when the rotor 4 to be measured is rotated.

The rotation angle detector 6 including the abovementioned magnetic detection IC is fixed to the separation member 8.

Further, the center of the bearing hole 81 of the separation member 8, the rotation center of the rotor 4 to be measured, the center of the detection element of the magnetic detection IC 61 of the rotation angle detector 6 which is fixed to the separation member 8, the center of the annular magnet 5, and the center (axis center) of the cylindrical-coil-like urging means 7 are arranged coaxially.

A slim-plate-shaped magnetic shield 6a bent to be C-shaped is arranged at the inner circumferential face of a wall section which surrounds the periphery of a ceiling section of the cap portion 3f of the cover 3 being at the side to which the rotation angle detection means 6, the rotor 4 to be measured and the like are accommodated so as to surround the rotation angle detector 6. Further, a disc-shaped magnetic shield 6b is also arranged to a section of the inner face side of the ceiling plate section of the cap portion 3f which is overlapped with the magnetic detection IC 61 (printed substrate) in the axial direction of the grip 1.

According to the accelerator device, in the abovementioned friction force applying mechanism, owing to that the grip-side rotary body 1a is rotated via the grip 1 with operation of the accelerator grip, the urging member 17 being the torsion coil spring is elastically deformed and urging force is generated in the opposite rotation direction to the rotation direction of the grip-side rotary body 1a. The urging force is exerted to the friction member 16.

For example, in the friction member 16, urging force indicated by arrow F1 is exerted to the engaging hole 16e to which the hook 17a of the urging member 17 is inserted out of the engaging holes 16e, as illustrated in FIG. 7(a). The urging force F1 indicated by the arrow is along the circumferential direction (the tangential direction of the circle, the direction perpendicular to the radial direction of the circle) at the position of the engaging hole 16e to which the hook 17a is inserted. Accordingly, in a case that the friction member 16 is rotatable about the center thereof, the urging force functions as force in the direction to rotate the friction member 16. However, since rotation of the friction member 16 is restricted owing to contact of the engagement portion 16f with the restriction portion 19, the friction member 16 is swung having a contact section between the restriction portion 19 and the engagement portion 16f as a fulcrum. Accordingly, the contact portion 16c slightly protruded from the inner circumferential face of the friction member 16 is pressed to the outer circumferential face of the grip-side rotary body 1a.

In FIG. 7(a), the center of the contact portion 16c is located at a position at approximate 90 degrees from the contact position between the restriction portion 19 and the engagement portion 16f and the engaging hole 16e to which the hook 17a is inserted is located at a position at less than 180 degrees from the contact position. In this case, a force component F2 of the urging force F1 from the center of the contact portion 16c toward the center of the cylindrical grip-side rotary body 1a is obtained by "F2=F1×cos α" where α denotes an angle between the urging force F1 and the force component F2 as illustrated in FIG. 7(b). Here, F3 denotes a force component of the urging force F1 perpendicular to the component F2.

Here, although the friction force between the contact portion 16c and the outer circumferential face of the grip-side rotary body 1a is varied linearly corresponding to the rotation angle of the grip-side rotary body 1a, the direction of the force exerted from the friction member 16 at the contact section between the contact portion 16c and the grip-side rotary body 1a is not varied. Accordingly, it is possible to provide stable rotation torque to accelerator operation while preventing occurrence of stepped torque characteristics even when wear occurs.

Further, in the friction applying mechanism, the urging member 17 arranged between the flange portion 16b of the friction member 16 and the rotation transmitting member 18 is arranged around the cylindrical portion 16a of the friction member 16 and the grip-side rotary body 1a to which friction is applied by the friction member 16 is arranged at the inner side of the friction member 16. Accordingly, length in the axial direction is to be determined only for the flange portion 16b, the rotation transmitting member 18, and the urging member 17 which is arranged therebetween. Therefore, the length in the axial direction can be shortened.

Further, only the grip-side rotary body 1a, the friction member 16 and the urging member 17 are members to be overlapped in the radial direction. Accordingly, size in the radial direction can be lessened as well. Considering the above, the friction applying mechanism of the accelerator device can be compactly arranged and miniaturization of the accelerator device can be achieved.

It is preferable that the urging member 17 being the torsion coil spring is in a state of being elastically deformed slightly so that urging force is exerted toward the returning side when the grip-side rotary body 1a is at the initial position. However, the urging member 17 is not required to be elastically deformed to be in a compressed state in the axial direction. In this case, the urging member 17 does not exert any force in the axial direction. Accordingly, there is no load to a fastening portion such as screws at a section of the housing and the like to support the friction applying mechanism and durability can be improved.

Here, since relatively large clearance is generated approximately evenly between the inner circumferential face of the friction member 16 and the outer circumferential face of the grip-side rotary body 1a at the whole circumference except for the contact portion 16c in a state that the contact portion 16c of the friction member 16 is abutted to the outer circumferential face of the grip-side rotary body 1a, foreign matters may enter thereto easily. However, since the base end side between the friction member 16 and the grip-side rotary body 1a is closed by the rotation transmitting member 18 and the distal end therebetween is closed by the guide portion 15, it is possible to prevent entering of foreign matters. Owing to prevention of entering of foreign matters, it is possible to prevent operation failure and poor operation due to entering of foreign matters to the accelerator device.

Further, since one torsion coil spring is used as the urging member 17 and the force of the urging member 17 in the rotation direction is converted into the force in the direction to press the contact portion 16c of the friction member 16 to the grip-side rotary body 1a by restricting rotation of the friction member 16 with the restriction portion 19, spring characteristics of the urging member is not required to be specifically limited and a spring to be the urging member 17 can be designed relatively freely. For example, any problem is not caused even when return force (spring load and the like) and angles (attaching positions of the hooks 17a, 17b) of a spring are varied.

Further, owing to variation of spring characteristics of the urging member 17, variation of the engagement position of the friction member 16 with the hook 17a of the urging member 17 and the position of the contact portion 16c, and variation of contact area of the contact portion 16c with the grip-side rotary body 1a, it is possible to adjust hysteresis of rotation of the grip-side rotary body 1a between torque during rotation to open a throttle valve and torque during rotation to close the throttle valve.

Further, although the grip-side rotary body 1a is cylinder-shaped, it is possible to obtain non-linear torque characteristics with variation in shape to be elliptic, to be oval, or to be slightly deviated from a circular cross-section.

That is, it is possible to vary the friction force exerted to the grip-side rotary body 1a owing to the shape of the outer circumferential face of the grip-side rotary body 1a as well as the elastic deformation amount of the urging member.

Further, the urging member 17 to return the grip 1 is arranged at the friction applying mechanism and the urging means 7 to return the rotor 4 to be measured is arranged as well at the rotation angle measuring mechanism, so that rotation of the rotor 4 to be measured and the grip-side rotary body 1a is mutually transmitted via the sector gear 13 of the rotation transmitting member 18 and the sector gear 41 of the rotor 4 to be measured. Accordingly, it is possible to return the rotor 41 to be measured to the initial position (toward the side to close the throttle valve) and to prevent non-returning of accelerator in case either thereof is broken. Further, in the structure to transmit rotation of the grip-side rotary body 1a to the rotor 4 to be measured and to measure the angle of the grip-side rotary body 1a via the rotor 4 to be measured, the grip-side rotary body 1a and the rotor 4 to be measured are structured to be urged in the return direction respectively with a spring. Accordingly, mounting posture is not limited and mounting can be performed in a flexible posture without largely influenced by gravity.

The grip 1 and the rotation transmitting member 18 are engaged between the concave portions 1b of the grip 1 and the convex portions 18f of the rotation transmitting member 18. Accordingly, it is possible to set to integrally rotate the grip 1 and the rotation transmitting member 18 after the grip 1 is rotated by a predetermined angle owing to circumferential clearance therebetween. In addition to the above, since the rotation transmitting member 18 and the rotor to be measured are provided respectively with a spring, it is possible to match angles at which the sensor output and the rotation torque start to be varied. Further, since rotation is transmitted from the grip 1 to the rotation transmitting member 18 with engagement between the abovementioned concave portions 1b and convex portions 18f, positional deviation of the grip 1 in the rotation axis direction and eccentric direction can be absorbed. Accordingly, it is possible to suppress influence of the positional deviation to sensor output and torque characteristics.

In the abovementioned embodiment, the rotary body is structured with separate members being the grip-side rotary body 1a and the rotation transmitting member 18. However, not limited to the above, it is also possible to integrally form the grip-side rotary body 1a and the rotation transmitting member 18.

Figure 9:
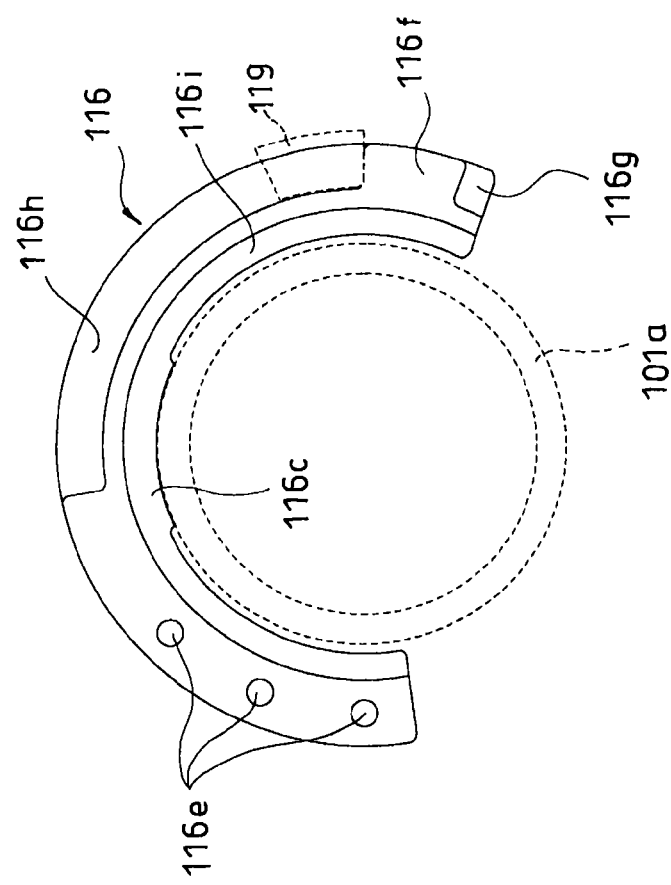
FIG. 9 is a front view illustrating a friction member being a modified example of the friction member for indicating relation between the friction member and the rotary body.

Here, the friction member 16 is not required to be annular. As illustrated in FIG. 9, a friction member 116 may be arc-shaped. That is, the friction member 116 may be arc-shaped as not being annular as long as basically including an engagement portion 116f as a portion with which rotation is restricted by a restriction portion 119, an engaging hole 116e with which the urging member 17 is engaged, and a contact portion 116c therebetween.

The friction member 116 is only required to have a shape like an arc (C-shape, semicircle) extended along the circumferential direction of the grip-side rotary body 101a around the grip-side rotary body 101a in a state of being spaced against the grip-side rotary body 101a except for the contact portion 116c. Here, numerals 116g, 116h and 116i denote cutout portions corresponding to the abovementioned cutout portions 16g, 16h and 16i.

In the following, a second embodiment will be described. In an accelerator device of the second embodiment, entering of foreign matters between the friction member 16 and the grip-side rotary body 1a is further suppressed compared to the accelerator device of the first embodiment. Further, in the accelerator device of the second embodiment, the grip-side rotary body 1a, the rotation transmitting member 18, and the cover 3 are varied in shape from the accelerator device of the first embodiment.

Figure 4:
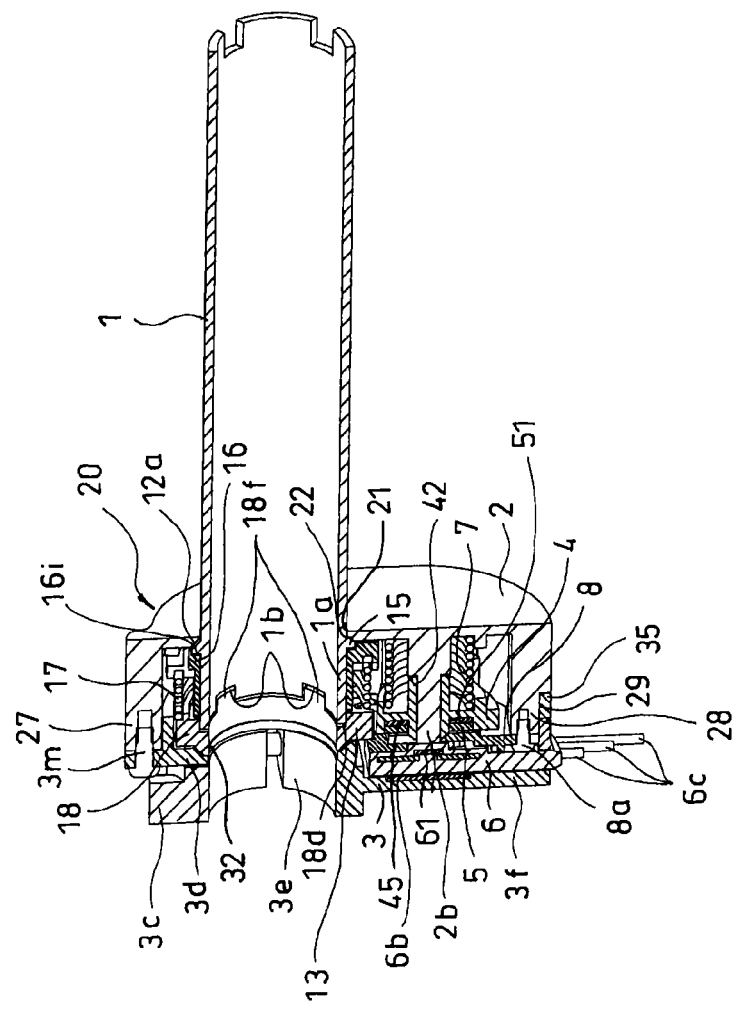
FIG. 4 is a cross-sectional perspective view illustrating the accelerator device.
Figure 5:
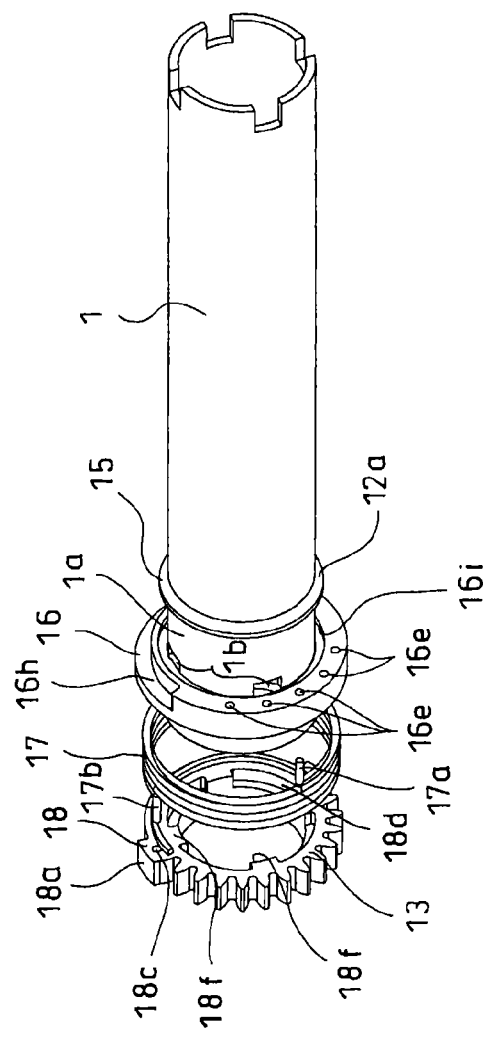
FIG. 5 is an exploded perspective view illustrating a main part of the accelerator device.
Figure 6:
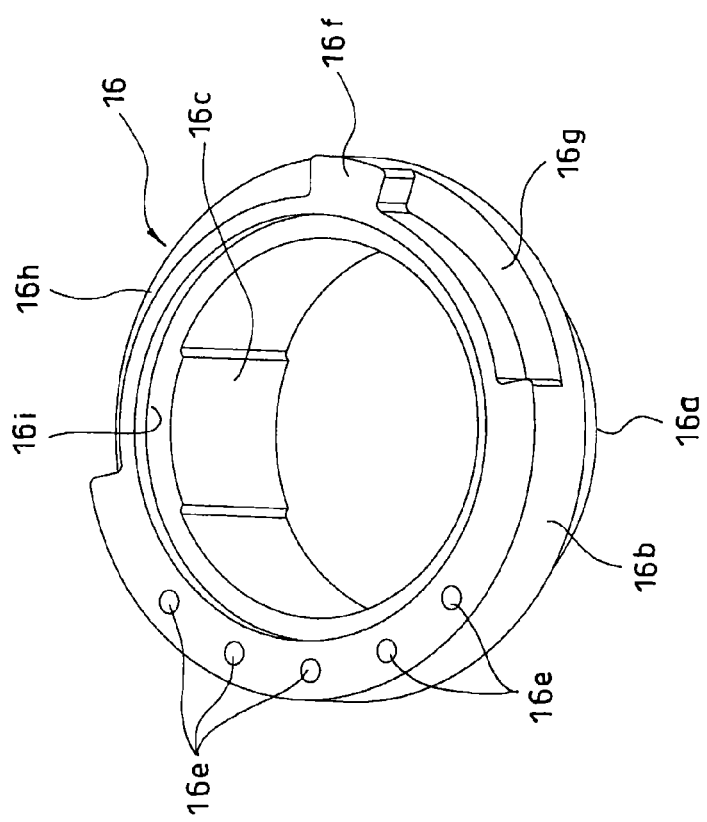
FIG. 6 is a perspective view illustrating a friction member of the accelerator device.
Figure 7:
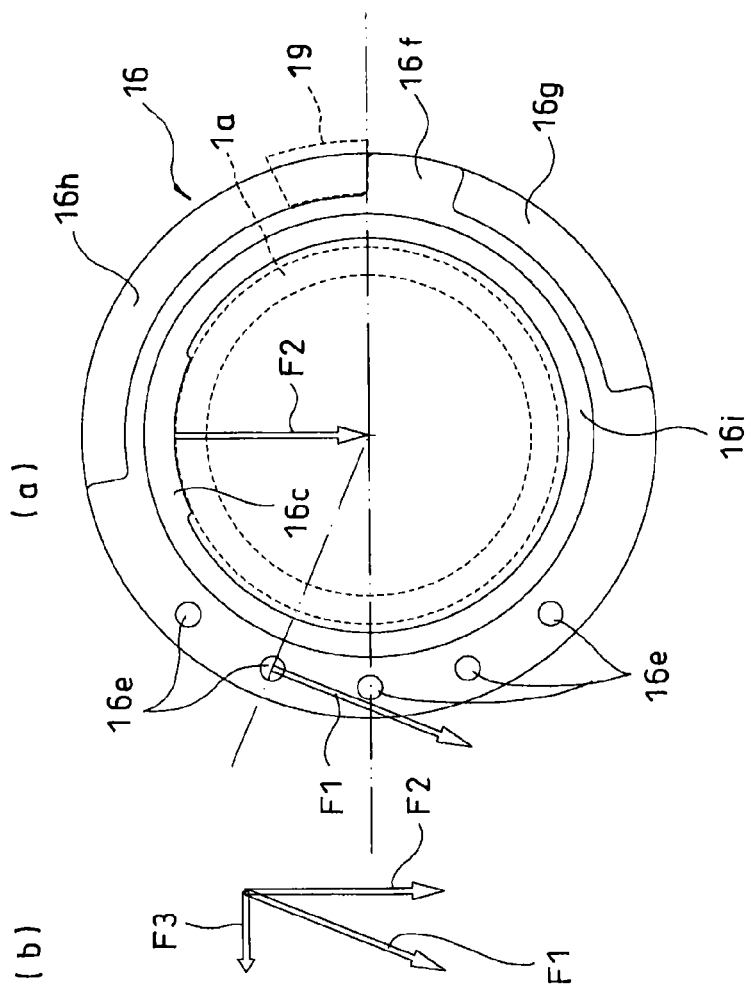
FIG. 7(a) is a front view illustrating the friction member for indicating relation between the friction member and a rotary body of the accelerator device and FIG. 7(b) is a view for indicating components of force exerted from the friction member to the rotary body.
Figure 8:
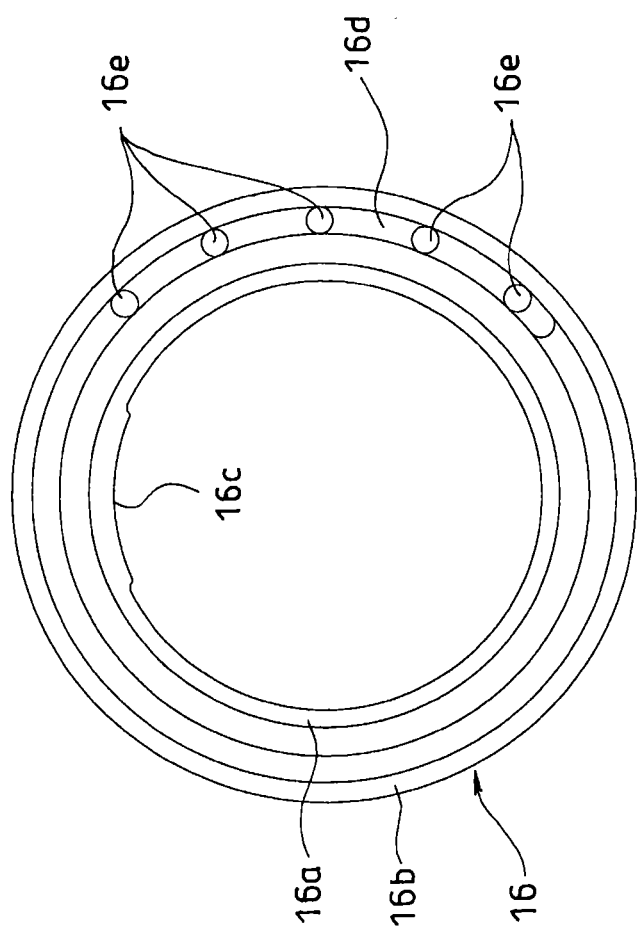
FIG. 8 is a rear view illustrating the friction member.
Figure 10:
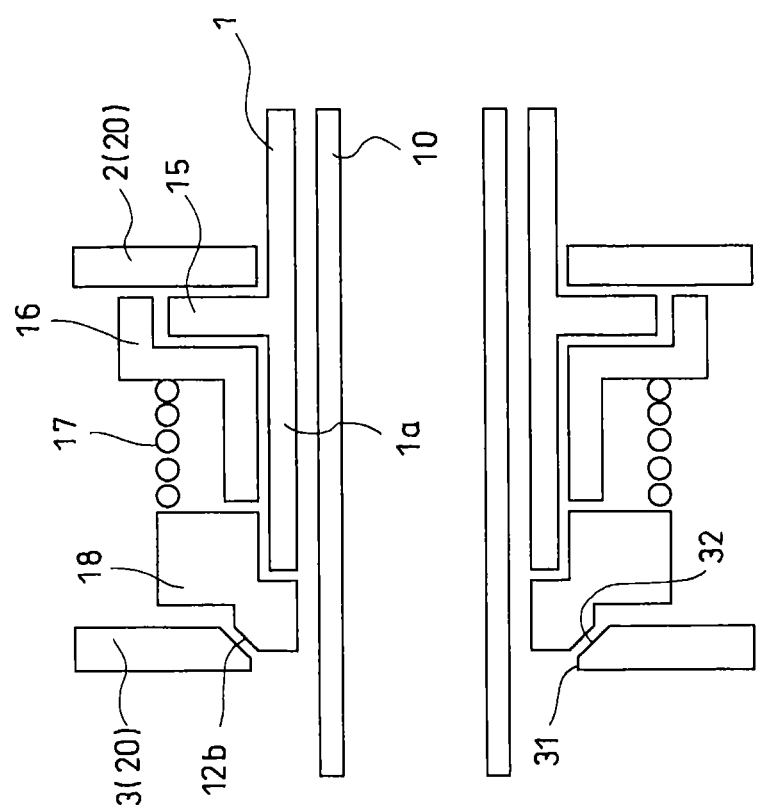
FIG. 10 is a schematic view illustrating a main part of the accelerator device.

Here, the accelerator device according to the first embodiment adopts the structure to prevent entering of foreign matters by closing the base end side between the friction member 16 and the grip-side rotary body 1a with the rotation transmitting member 18 and closing the distal end side with the guide portion 15, as illustrated in a cross-sectional view of FIG. 4 and a schematic view of FIG. 10.

Here, in the first embodiment, the rotation transmitting member 18 being a gear to transmit rotation from the grip 1 (grip-side rotary body 1a) to the rotor 4 to be measured for measuring the rotation angle of the grip-side rotary body 1a is separated from the grip 1 (grip-side rotary body 1a) as not being integrated therewith. Accordingly, the concave portions 1b of the grip-side rotary body 1a (grip 1) are engaged with the convex portions 18f of the rotation transmitting member 18 which is rotated as being interlocked with the grip-side rotary body 1a. A coupling portion which couples the grip-side rotary body 1a and the rotation transmitting member 18 in an integrally rotatable manner is arranged with the concave portions 1b and the convex portions 18f.

At the coupling portion, for matching angles at which the sensor output and the rotation torque start to be varied and absorbing positional deviation of the grip 1 in the rotation axis direction and eccentric direction as described above, slight clearance is arranged at the engagement section between the concave portions 1b and the convex portions 18f as described above.

Accordingly, for example, sealing material cannot be arranged to infill the abovementioned clearance of the coupling portion. Therefore, there is a fear of the entrance of foreign matters. In this case, it is difficult to completely prevent foreign matters entered from the coupling portion from further entering between the grip-side rotary body 1a and the friction member 16.

Further, in the first embodiment, the cover penetration hole 31 penetrating the handlebar 10 is formed at the cover 3 of the casing 20. The taper face 12b of the base end part of the rotation transmitting member 18 is abutted to the annular taper face 32 arranged at the periphery of the cover penetration hole 31. The rotation transmitting member 18 is rotatably supported by the cover 3 in a state that movement thereof in the radial direction perpendicular to the axial direction is restricted by the taper face 32 and the taper face 12b.

Further, an end face of the grip-side rotary body 1a at the cover 3 side is abutted to a face of the rotation transmitting member 18 at the axially opposite side to the taper face 12b.

In this case, the rotation transmitting member 18 is interposed between the cover 3 and the grip-side rotary body 1a (grip 1) and the rotation transmitting member 18 is arranged at the inner circumference side from the outer circumferential face of the grip-side rotary body 1a. Accordingly, the rotation transmitting member 18 is in a state of being exposed to the inner circumference side of a section of the accelerator device through which the handlebar 10 passes.

Figure 11:
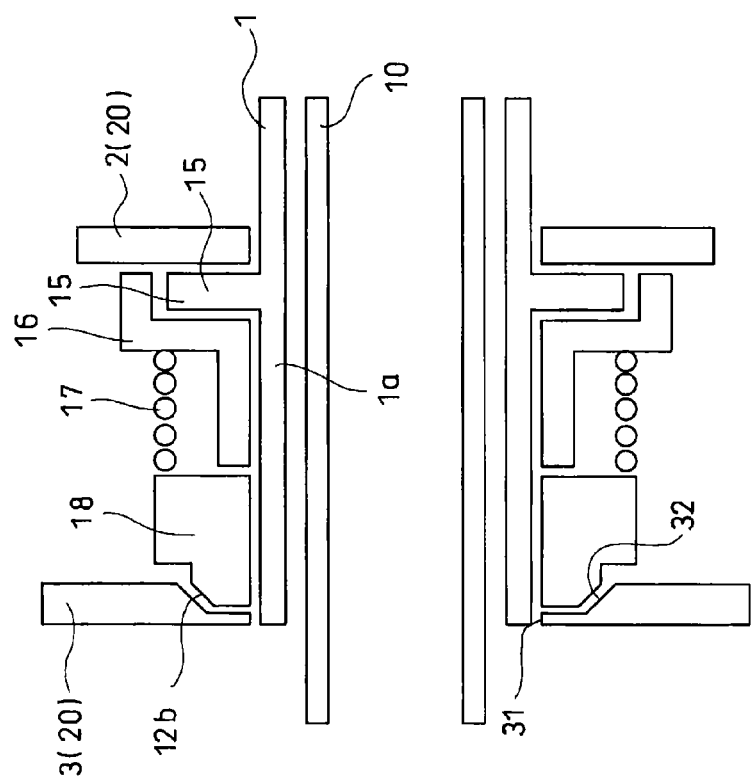
FIG. 11 is a schematic view illustrating a main part of an accelerator device according to a second embodiment of the present invention.
Figure 12:
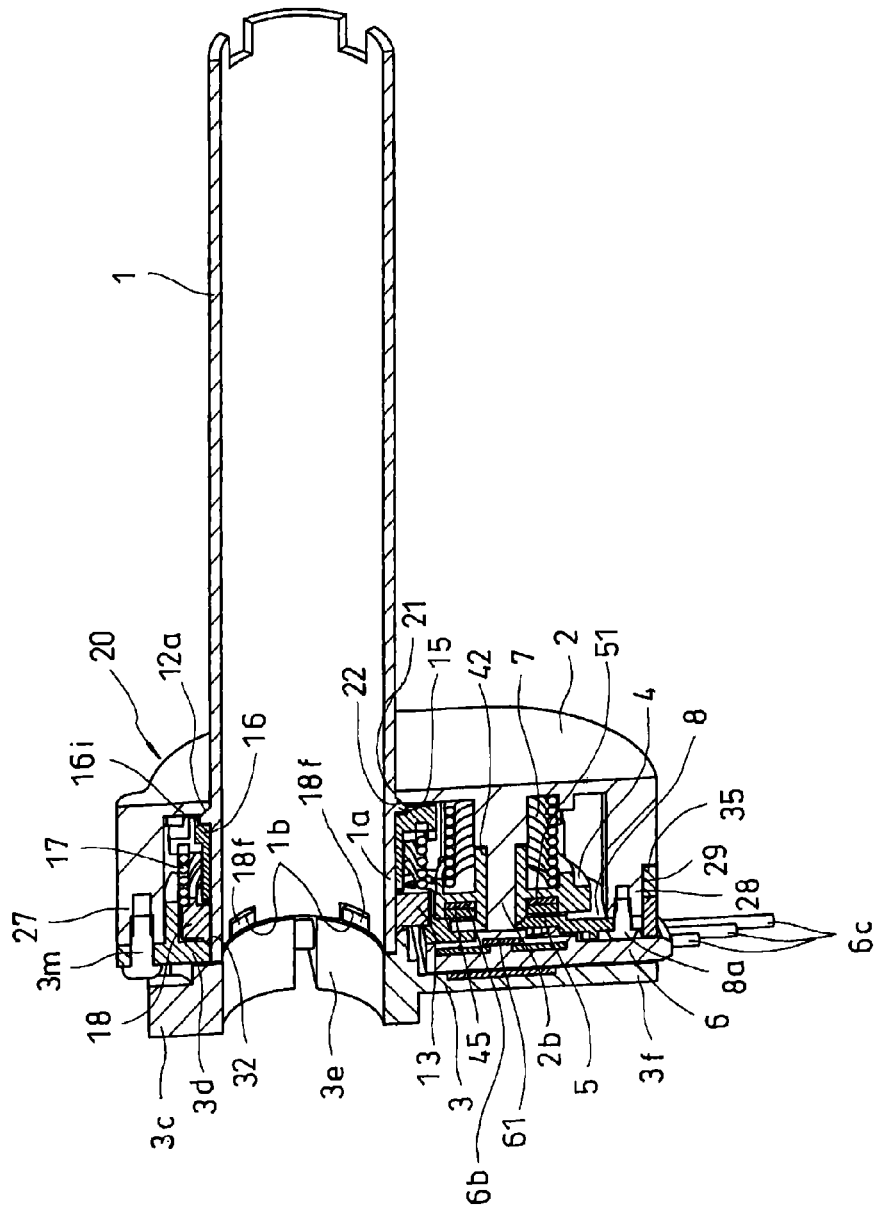
FIG. 12 is a cross-sectional perspective view illustrating an accelerator device of the second embodiment.

In contrast, in the second embodiment, an end part of the grip-side rotary body 1a at the cover 3 side in the axial direction is abutted to the cover 3 and the rotation transmitting member 18 is not interposed between the grip-side rotary body 1a and the cover 3, as illustrated in FIGS. 11 and 12.

In the second embodiment, the rotary transmitting member 18 is not superimposed between the cover 3 and the grip-side rotary body 1a and the rotation transmitting member 19 except for the convex portions 18f is arranged at the outer side of the grip-side rotary body 1a.

Similarly to the first embodiment, the concave portions 1b are formed at the end part of the grip-side rotary body 1a at the cover 3 side. The grip-side rotary body 1a is formed slightly longer in the axial direction than the case of the first embodiment and the end part of the grip-side rotary body 1a at the cover 3 side is abutted to the cover 3, as described above. Thus, location of the concave portions 1b is shifted to the cover 3 side compared to the case of the first embodiment. The coupling portion is structured by engaging the convex portions 18f formed at the inner circumferential face of the rotation transmitting member 18 at the cover 3 side with the concave portions 1b.

In the first embodiment as well, the concave portions 1b are arranged at the end part of the grip-side rotary body 1a at the cover 3 side and the end part of the rotation transmitting member 18 at the case 2 side is placed at the outer circumference side thereof, and then, the coupling portion is structured with engagement of the concave portions 18f formed at the inner circumferential face of the end part. However, in the first embodiment, the end part of the grip-side rotary body 1a is abutted to the rotation transmitting member 18 but not to the cover 3. Here, the rotation transmitting member 18 is interposed between the cover 3 and the grip-side rotary body 1a as described above.

In the second embodiment, the taper face 32 formed at the periphery of the cover penetration hole 31 of the cover 3 is arranged at a position being the outer side of the grip-side rotary body 1a. Here, the taper face 18d of the rotation transmitting member 18 arranged outside the grip-side rotary body 18 except for the convex portions 18f is abutted to the abovementioned taper face 32 at the outside of the grip-side rotary body 1a. Further, the end part of the grip-side rotary body 1a at the cover 3 side is protruded to the cover 3 side from the abutment section between the taper face 18d and the taper face 32.

In the accelerator device of the second embodiment, the structure other than shapes of the cover 3, the rotation transmitting member 18, and the grip-side rotary body 1a is similar to the structure of the accelerator device of the first embodiment. Accordingly, operational effects similar to the accelerator device of the first embodiment can be obtained.

In the accelerator device of the second embodiment, the grip-side rotary body 1a is abutted to the cover 3 without the rotation transmitting member 18 interposed between the grip-side rotary body 1a and the cover 3. Accordingly, the rotation transmitting member 18 is basically arranged at the outer circumference side of the grip-side rotary body 1a to be less likely to have foreign matters enter from the outside. Here, there is a fear that foreign matters enter from the inner circumference side where the handlebar 10 is inserted at the coupling section between the concave portions 1b of the grip-side rotary body 1a and the convex portions 18f of the rotation transmitting member 18. However, since the coupling section and the abutment section are farther from the friction member 16 than the case of the first embodiment, entering of foreign matters between the friction member 16 and the grip-side rotary body 1a can be further suppressed.

That is, owing to that the coupling section of the grip-side rotary body 1a and the rotation transmitting member 18 in the second embodiment is farther from the friction member 16 than the coupling section of the grip-side rotary body 1a and the rotation transmitting member 18 in the first embodiment, entering of foreign matters between the friction member 16 and the grip-side rotary body 1a is suppressed. According to the above, in the accelerator device of the second embodiment, entering of foreign matters between the friction member 16 and the grip-side rotary body 1a can be further suppressed compared to the accelerator device of the first embodiment. Accordingly, the accelerator device of the second embodiment has a higher possibility to obtain more stable friction force (torque characteristics). In addition, it is possible to suppress occurrence of sticking due to entering of foreign matters to the section of friction faces where friction occurs between the friction member 16 and the grip-side rotary body 1a.

In the above, the accelerator device having the friction applying mechanism is adopted for an accelerator grip which is used for a motorcycle, a three-wheel or four-wheel buggy, a power-assisted bicycle, a snowmobile, a personal water craft, a small outboard engine, or the like. Here, it is also possible to be adopted for an accelerator pedal. In this case, it is required to convert operation of the accelerator pedal into rotation of the grip-side rotary body 1a with a variety of transmitting members.

What is claimed is:

1. An accelerator device, comprising:
   a housing;
   a rotary body which is rotated with accelerator operation;
   a friction member which is arranged at a periphery of the rotary body while being provided with a contact portion to apply resistance due to friction as being contacted to the rotary body;
   an urging member having one end side engaged with the rotary body and the other end side engaged with the friction member; and
   a restriction portion which is arranged at the housing and which restricts rotation of the friction member with urging force of the urging member as being contacted to the friction member,
   wherein the urging member urges the rotary body in a direction to return to an initial position of rotation against the housing owing to that rotation of the friction member is restricted against the housing by the restriction member when the rotary body is rotated against the housing; and
   the friction member is urged by the urging member in a direction that the contact portion is pressed to the rotary body having the restriction portion as a fulcrum.

2. The accelerator device according to claim 1, wherein the friction member is provided with the contact portion being apart from a contact position of contacting to the restriction portion so that the contact portion is swingable in a direction of pressing the contact portion to the rotary body having the restriction portion as a fulcrum.

3. The accelerator device according to claim 2, wherein the friction member is provided with the contact portion which is spaced from the contact position of contacting to the restriction portion in a circumferential direction of the rotary body as being aligned in the circumferential direction.

4. The accelerator device according to claim 3, wherein the friction member is annulus-shaped or arc-shaped along the circumferential direction of the rotary body having a face which is oriented to the rotary body side except for the contact portion arranged as being spaced from the rotary body in a state that the contact portion is contacted to the rotary body.

5. The accelerator device according to claim 3, wherein a contact position of contacting to the restriction portion and an engagement position of engaging with the urging member are arranged apart in the friction member so that the friction member is swung with urging force of the urging member having the restriction portion as a fulcrum.

6. The accelerator device according to claim 5, wherein the contact position of contacting to the restriction portion and the engagement position of engaging with the urging member are spaced in the friction member in a circumferential direction of the rotary body as being aligned in the circumferential direction.

7. The accelerator device according to claim 2, wherein the friction member is annulus-shaped or arc-shaped along the circumferential direction of the rotary body having a face which is oriented to the rotary body side except for the contact portion arranged as being spaced from the rotary body in a state that the contact portion is contacted to the rotary body.

8. The accelerator device according to claim 2, wherein a contact position of contacting to the restriction portion and an engagement position of engaging with the urging member are arranged apart in the friction member so that the friction member is swung with urging force of the urging member having the restriction portion as a fulcrum.

9. The accelerator device according to claim 8, wherein the contact position of contacting to the restriction portion and the engagement position of engaging with the urging member are spaced in the friction member in a circumferential direction of the rotary body as being aligned in the circumferential direction.

10. The accelerator device according to claim 1, wherein the friction member is annulus-shaped or arc-shaped along the circumferential direction of the rotary body having a face which is oriented to the rotary body side except for the contact portion arranged as being spaced from the rotary body in a state that the contact portion is contacted to the rotary body.

11. The accelerator device according to claim 1, wherein a contact position of contacting to the restriction portion and an engagement position of engaging with the urging member are arranged apart in the friction member so that the friction member is swung with urging force of the urging member having the restriction portion as a fulcrum.

12. The accelerator device according to claim 11, wherein the contact position of contacting to the restriction portion and the engagement position of engaging with the urging member are spaced in the friction member in a circumferential direction of the rotary body as being aligned in the circumferential direction.

* * * * *